(Model.) 7 Sheets—Sheet 1.

A. A. PARKER & J. F. LANDERS.
FENCE MAKING MACHINE.

No. 401,298. Patented Apr. 9, 1889.

Fig.1

WITNESSES:
B. von Bültzingslöwen
Fredk W. Rubien.

INVENTORS,
A. A. Parker
John F. Landers
BY
Singer & Brie
ATTORNEYS.

(Model.)

A. A. PARKER & J. F. LANDERS.
FENCE MAKING MACHINE.

No. 401,298. Patented Apr. 9, 1889.

WITNESSES:

INVENTORS.
A. A. Parker
John F. Landers.
BY
ATTORNEYS.

(Model.)

A. A. PARKER & J. F. LANDERS.
FENCE MAKING MACHINE.

No. 401,298.

Patented Apr. 9, 1889.

WITNESSES:
Br. von Bültzingslöwen
Fredˣ W. Rubien.

INVENTORS.
A. A. Parker.
John F. Landers.
BY
Singerolbnz.
ATTORNEYS.

(Model.) 7 Sheets—Sheet 5.
A. A. PARKER & J. F. LANDERS.
FENCE MAKING MACHINE.

No. 401,298. Patented Apr. 9, 1889.

WITNESSES:
Br. von Bültzingslöven
Fredk W. Rubien

INVENTORS
A. A. Parker
John F. Landers
BY
Singer Ebing
ATTORNEYS.

(Model.)　　　　　　　　　　　　　　　　　　　　　7 Sheets—Sheet 6.
A. A. PARKER & J. F. LANDERS.
FENCE MAKING MACHINE.

No. 401,298.　　　　　　　　　　　　　Patented Apr. 9, 1889.

WITNESSES:

INVENTORS.

ATTORNEYS.

(Model.)

A. A. PARKER & J. F. LANDERS.
FENCE MAKING MACHINE.

No. 401,298. Patented Apr. 9, 1889.

Witnesses.
Fred'k H. Rubien
N. J. Bulkley

Inventor
Arthur A. Parker
John F. Landers
By their Attorneys
Singer & Ebner

UNITED STATES PATENT OFFICE.

REISSUED

ARTHUR A. PARKER AND JOHN F. LANDERS, OF JERSEY CITY, NEW JERSEY.

FENCE-MAKING MACHINE.

SPECIFICATION forming part of Letters Patent No. 401,298, dated April 9, 1889.

Application filed May 9, 1888. Serial No. 273,343. (Model.)

*To all whom it may concern:*

Be it known that we, ARTHUR A. PARKER and JOHN F. LANDERS, both citizens of the United States, and both residing at Jersey City, in the county of Hudson and State of New Jersey, have invented a new and useful Improvement in Fence-Making Machines, of which the following is a specification.

The nature of the invention consists in the details of construction and combination, substantially as illustrated in the drawings hereinafter described, and subsequently pointed out in the claims.

Fig. 6ª illustrates the same picket-feed.

X designates the frame of the machine. Upon this is journaled the main shaft A in boxes of any convenient and well-known form. One end of said shaft A projects without said frame. Upon this end is mounted the spur-wheel G and the pulley E, both outside of the frame. Upon the frame X is also journaled in suitable bearings three or more shafts, B B' B'', parallel to each other and parallel to said main shaft. Upon these auxiliary shafts B B' B'' are mounted the spur-wheels H H' H'', the wheel H gearing into the wheel G of the main shaft. Upon these shafts B B' B'' are mounted the spools D, upon which wire is wound. The wire of each spool passes through a conduit in the inner end of the shaft on which it is mounted.

The main shaft A extends within the machine, and upon its inner end is mounted the bevel-wheel V. Another auxiliary shaft, C', is journaled in bearings on said frame parallel to said main shaft. Mounted on the outer end of this shaft C' is the spur-wheel I', which meshes into the spur-wheel G upon the main shaft A. Upon the inner end of this shaft C' is mounted the disk-wheel K. This disk-wheel is constructed with an eccentric groove in its face. A connecting-bar, K$^\times$, couples this disk-wheel to the segmental spur-wheel T$^\times$. This wheel is mounted on a shaft, T$^4$, which is journaled in suitable bearings on the frame of said machine. This shaft is directly below the inner end of the main shaft A. Directly above this, carried upon the lower end of the oscillating shaft S' and meshing into the wheel T$^\times$, is the segmental spur-wheel S$^\times$. The oscillating shaft S' is carried by a shaft, S'', journaled in the middle of the main shaft, and of a short shaft, T'', journaled in said frame, directly opposite to and concentric with said main shaft, so that the perimeter of said segmental wheel S$^\times$ and the motion of the said oscillating shaft S' are concentric with the main shaft A.

The bevel-wheel S is mounted on the upper end of the shaft S' and meshes into the bevel-wheel V upon the main shaft A. Upon the shaft T'' is mounted a bevel-wheel, T, which meshes into the wheel S. Upon this shaft T'' is also mounted a spur-wheel, T', which meshes into an intermediate spur-wheel, U$^\times$, which is mounted upon a proper bearing in the frame of said machine. Into this intermediate wheel, U$^\times$, meshes the spur-wheel U'. The spur-wheels U, U', and U'' all mesh together, and are mounted on one end of short shafts journaled in bearings on the top of said machine. Upon the other end of each of these shafts is mounted a pair of twisting-fingers. (Designated by *i*.) These fingers, which are tubular, are each bent into helical form, like the thread of a screw. Two conduits, 1, run through the whole length of each of said shafts. One of these conduits connects with each of the said twisting-fingers, so that a wire from one of said spools D may be drawn through each of said conduits and each of said twisting-fingers, to be twisted upon the wood pickets while making the fence. These twisting-fingers are given their peculiar form in order that if the motion of the twisting-head should continue a little after the picket is put into the machine—an effect of the inertia of the mechanism—the twisting-fingers coming into contact with the picket will not be marred themselves, nor will they mar the picket, for on account of their helical shape they will in such case only act as a screw to push the picket a little way from the twisting-head. These twisting-fingers are also set a little apart, so that they will hold the wires—
one on each side of the picket—in proper position to be twisted thereon, and when twisted properly to embrace said picket. Upon said frame of said machine is also journaled another auxiliary shaft, C. A spur-wheel, I, mounted upon the outer end of this shaft, meshes into the spur-wheel G of the main shaft. A bevel-wheel, L, is mounted on the inner end of said shaft C. A cross-shaft, M, journaled in proper bearings in the supporting-frame of said machine, is placed at right angles to the shaft C. Upon this shaft M is mounted a bevel-wheel, L', which meshes into the wheel L upon the shaft C. Two disk-wheels (designated by $a$ and $a$) are also mounted upon this shaft M. In the face of each of these disk-wheels is an eccentric groove. $c\ d$ designate an oscillating frame, which is pivotally attached to the supporting-frame of the machine. This frame $c\ d$ is coupled with the eccentrics $a\ a$ by means of connecting-bars $b$, which are pivotally connected by one end to the said oscillating frame, and upon the other end carry friction-rollers which work in the eccentric grooves in the disk-wheels $a$, so that an intermitted oscillating motion of the frame $c\ d$ is produced by the revolution of the disk-wheels $a\ a$. The upper part, $d$, of this frame $c\ d$ is provided with downwardly-projecting fingers $e$, which work on either side of and between the twisting-fingers $i$. The bevel-wheel L'' is mounted upon the end of the shaft M. Meshing into this is a bevel-wheel, L''', mounted upon the inclined shaft M'. This shaft M', which is journaled in proper bearings on the frame of said machine, extends diagonally upward above the top of said machine and carries upon its top a disk-wheel, Q. In the face of this wheel is an eccentric groove, $h'$. The pin $h''$, carrying a friction-roller, works in this groove $h'$. The pin itself is carried by the connecting-bar $f$, which couples the slide $h$ with said eccentric. This slide moves intermittingly backward and forward in a groove in the top of said machine as the disk-wheel Q revolves.

The pulley P is mounted upon the shaft M and connected with the pulley P' of the shaft N by the belt $P^×$. The shafts N and N carry pulleys R R R R, which are connected by the belts $R^×$ and $R^×$. Upon the inner end of the outer shaft, N, is mounted a bevel-wheel, $O^×$, which meshes into another bevel-wheel, O', mounted upon one end of the shaft Z. This shaft Z is journaled in bearings upon the frame of the machine and carries a pulley, Z', upon its inner end. Upon this, in connection with the pulleys Z'', Z''', and $Z^×$, is stretched the belt $z$, so that when the pulley Z' revolves the belt travels over the said pulleys, the pulleys Z'' and $Z^×$ being so placed that the belt $z$ running over them will have its upper surface a little above the lower surface of the way through which a picket must travel to enter the machine. Above these pulleys Z'' and $Z^×$ are placed bent springs $z'$ to press said picket down upon the said belt as it enters the machine.

Figure 1:
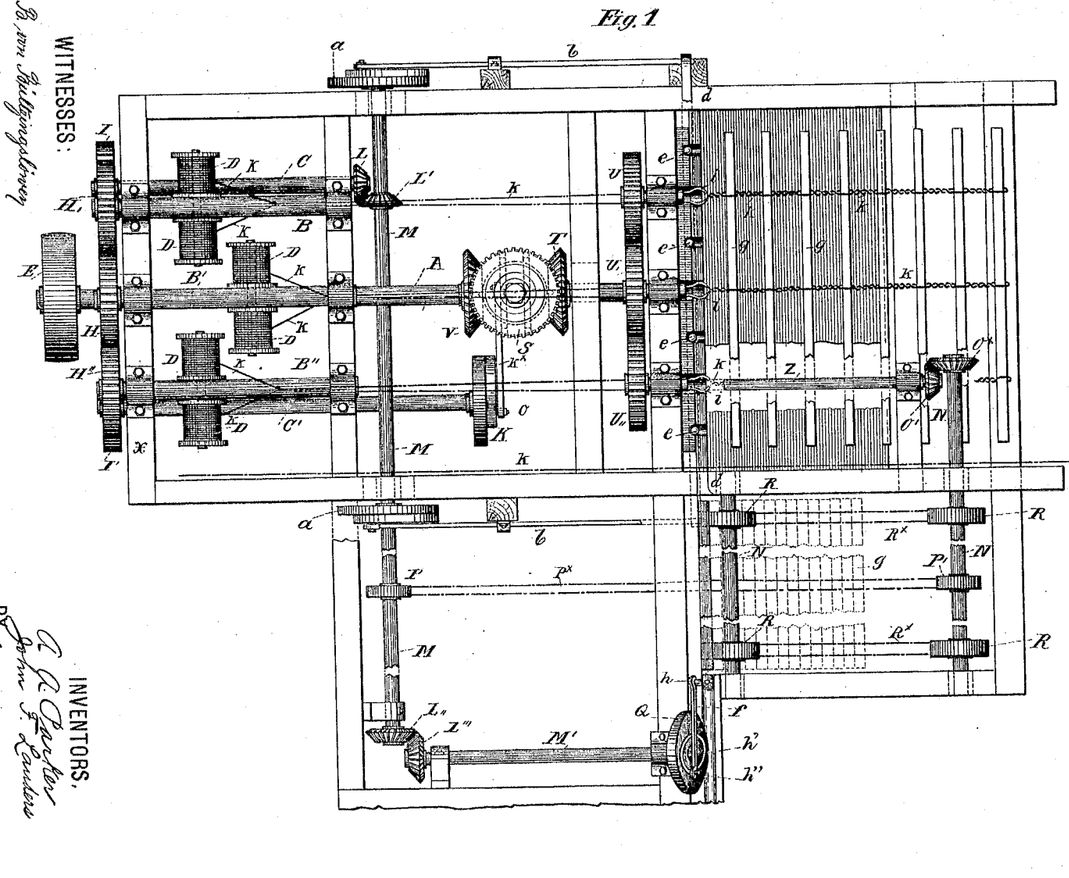
Figure 1 is a plan view illustrating the top of our newly-invented fence-weaving machine.
Figure 2:
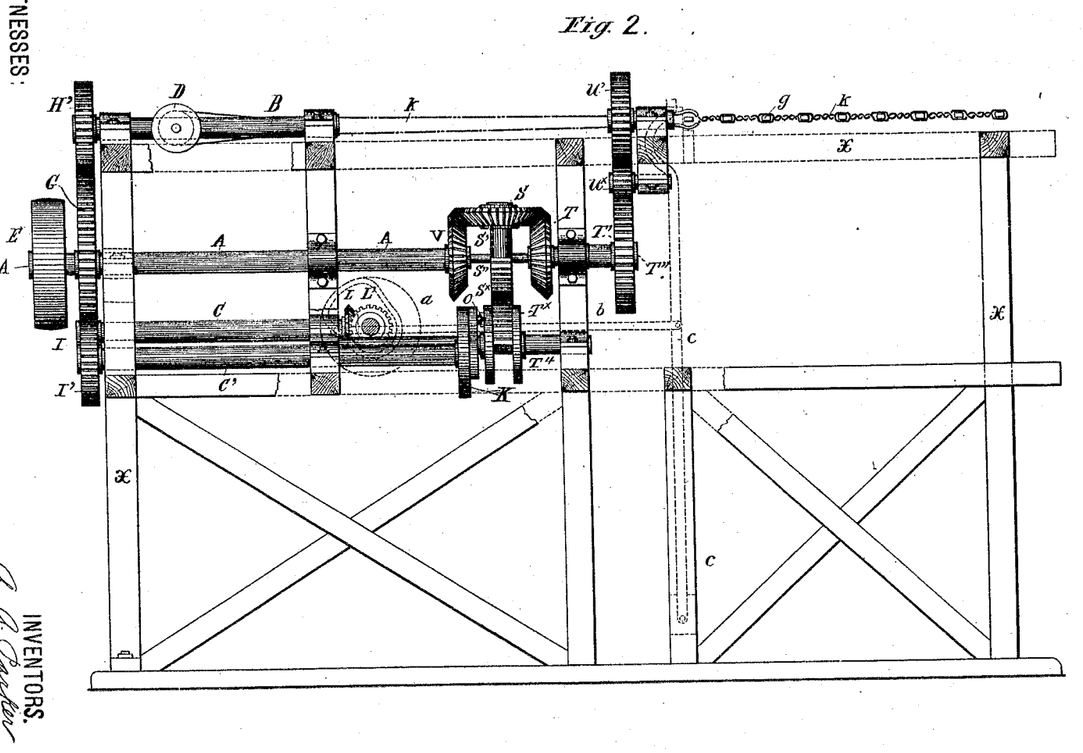
Fig. 2 is a vertical sectional view of the same.
Figure 3:
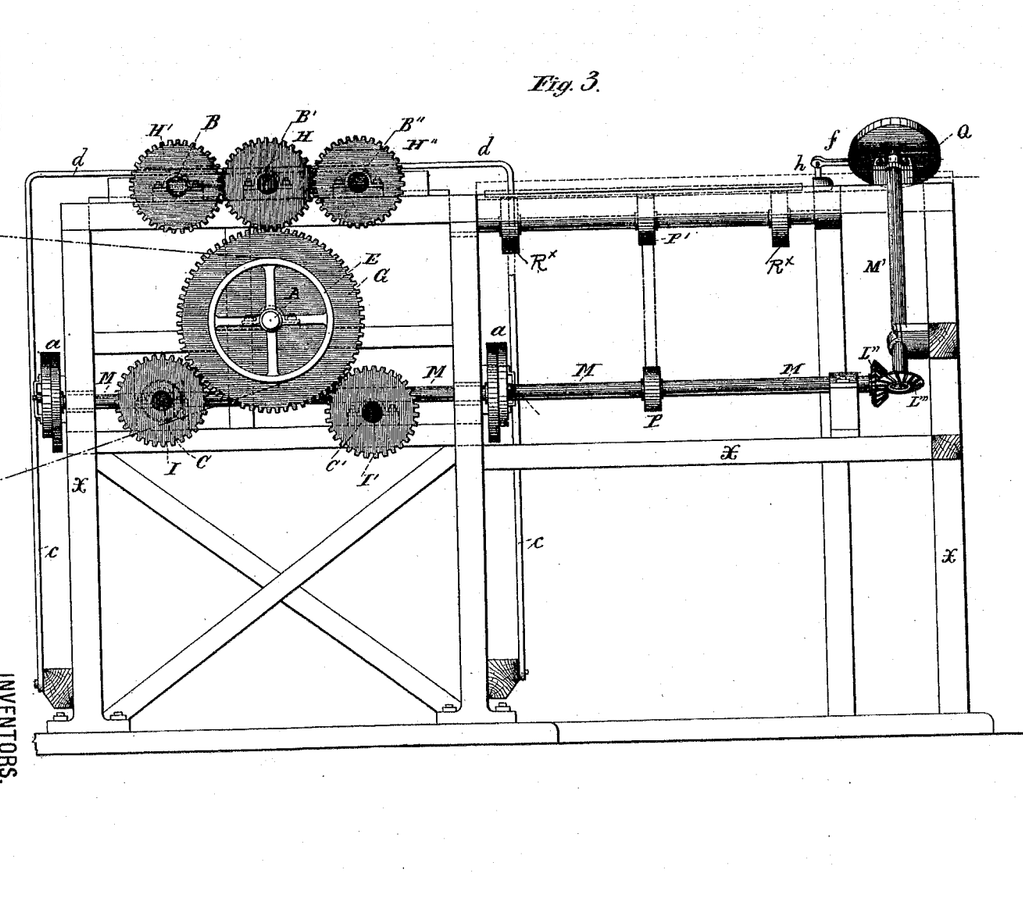
Fig. 3 is an end view of the same in elevation.
Figure 4:
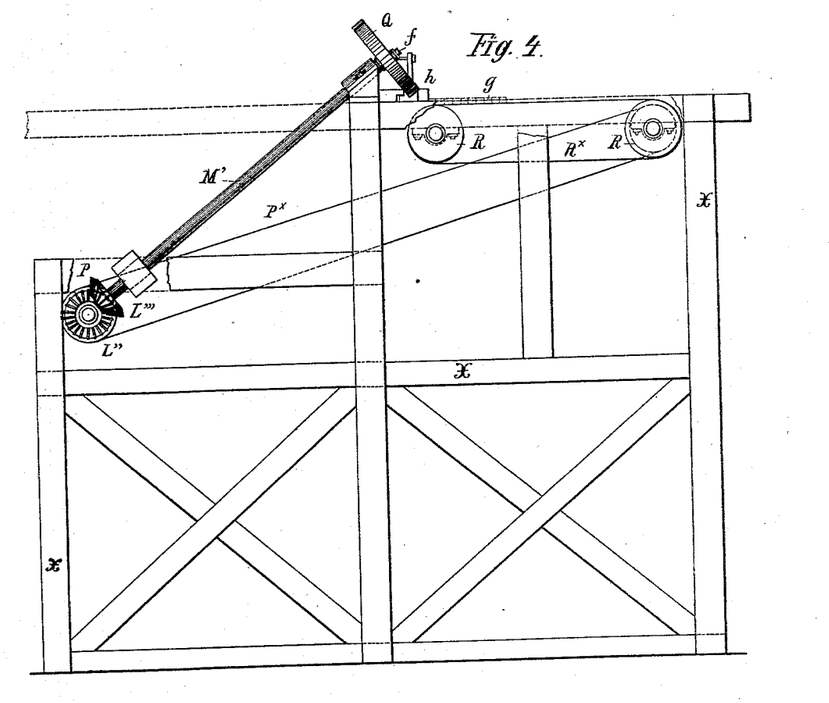
Fig. 4 is a partial side view of the same.
Figure 5:
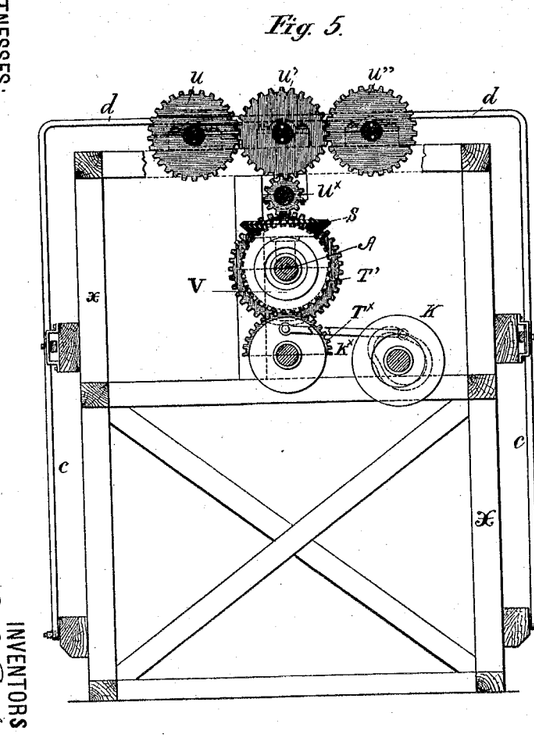
Fig. 5 is another sectional view of the same.
Figure 6:
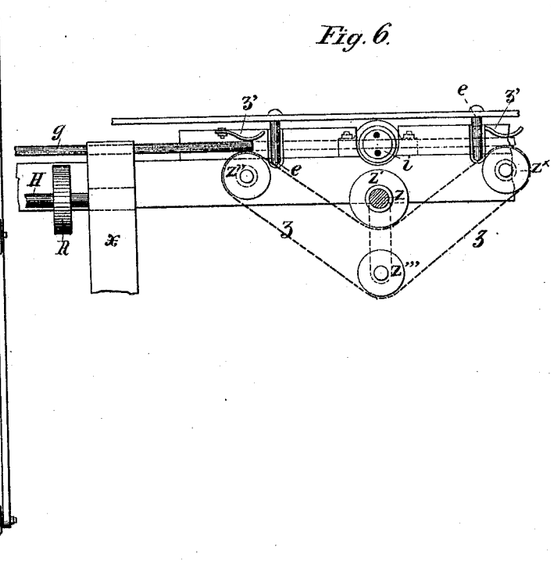
Fig. 6 is a detail view illustrating a part of the picket-feed of the machine.
Figure 6A:
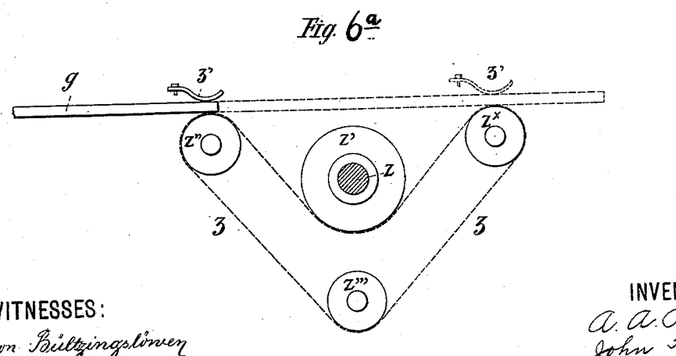
Figure 7:
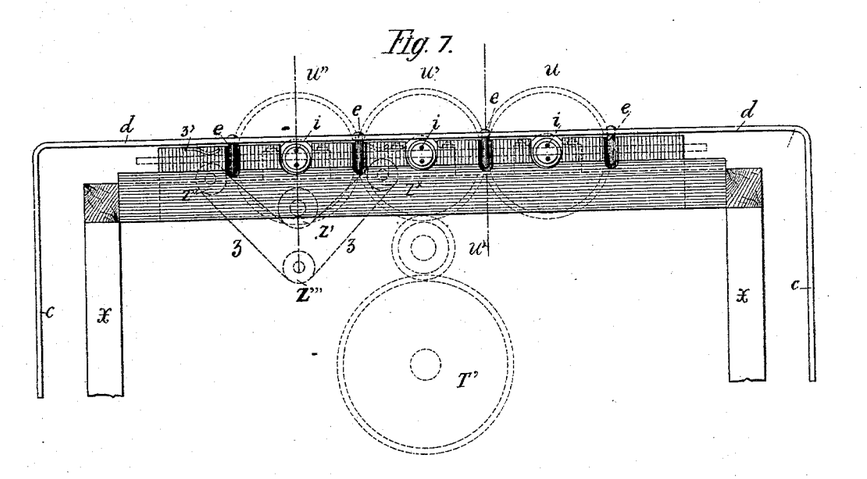
Fig. 7 is a transverse sectional view further illustrating said machine.
Figure 8:
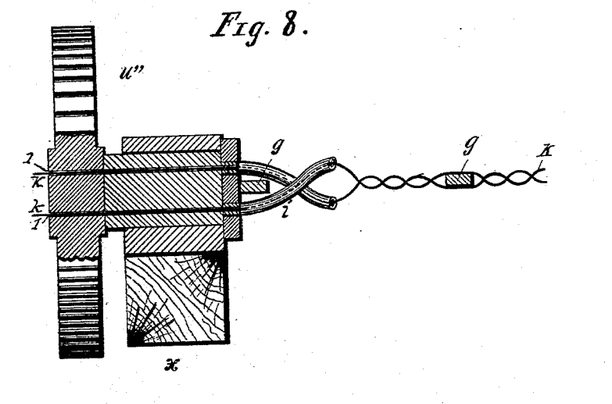
Fig. 8 is a partial sectional view taken through the axial center of the wheel U''' of Fig. 7.
Figure 9:
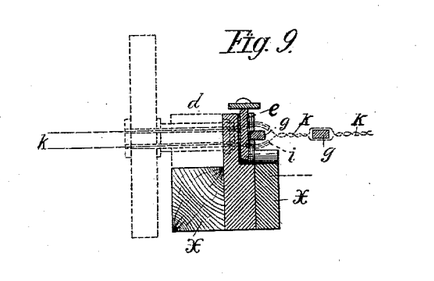
Fig. 9 is another partial sectional view taken on a line between the wheels U and U' of Fig. 7.
Figure 10:
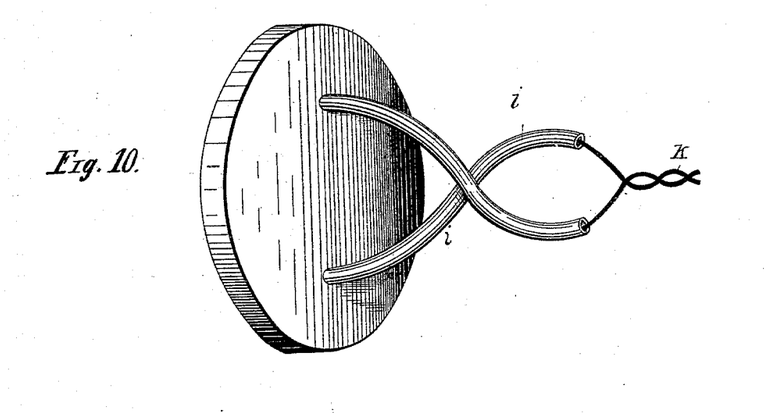
Fig. 10 is a detail view illustrating one of the pairs of twisting-fingers of said machine.

This machine is used for making a fence with wooden pickets and wire. The ends of the wires $k$, which were wound upon the spools D, are brought through the conduits in the shafts and through the twisting-fingers, as hereinbefore described. The machine is then put in motion by means of a belt running on the pulley E and connecting with a power.
Then the pickets to be secured in place are laid side by side, parallel to each other, across the belts $R^×\ R^×$, as illustrated by $g$ in dotted lines in Fig. 1. The motion of these belts will carry the pickets toward the groove in which the slide $h$ works. As soon as one of the pickets arrives at the proper place, it will be pushed endwise toward the fingers $i$. As soon as its end arrives between the belt $z$ upon the pulley Z'' and the spring $z'$ it will by the action of said belt be carried forward into said machine between the twisting-fingers and into proper position to be made into fence. During this time the frame $c\ d$ and the twisting-fingers $i$ are still, and the fingers $e$ of said frame $c\ d$ are stationary behind the picket; but when the picket is in proper place, the eccentric $a$ having revolved far enough, the frame $c\ d$ begins to move and the fingers $e$ to push the picket out sidewise, at the same time the oscillating shaft S' having completed its motion one way, through which no motion is transmitted by the wheel S, begins to move the other way. Immediately the wheels U U' and U'', the shafts on which they are mounted, and the twisting-fingers, begin to turn. The twisting-fingers $i$, by reason of their helical shape, acting like a screw upon the picket, assist the fingers $e$ of the frame $c\ d$ in pushing said picket outward from the twisting-heads, neither marring the picket nor being marred themselves by their contact therewith. After the picket in its outward motion has passed the points of the twisting-fingers the said fingers, by reason of their rotary motion, twist the two wires held by each pair of fingers upon each other, so that they embrace the picket and are twisted between the fingers and the picket. When the picket has moved far enough from the twisting-fingers and sufficient length of wire has been twisted between the twisting-fingers and the picket, the eccentrics $a$ draw back the frame $c\ d$, the oscillating shaft S', having completed its stroke, turns the other way, the twisting apparatus ceases to revolve, and another picket is pushed into the machine by the slide $h$, ready to be worked into the fence, as before described. This may be continued until the machine has made a fence of sufficient length.

It is obvious that the shafts B B' B'' may be placed at any convenient and desirable distance apart, so that the wire-spools may be made of any desired size. It is also obvious that there may be any desired number of these shafts—one for each separate line of wire to be woven into the fence. In any case, however, there must be one shaft carrying the twisting-fingers for each shaft carrying spools.

What we claim as our invention, and desire to secure by Letters Patent, is—

1. The combination, in a fence-making machine, with a supporting-frame, a revoluble main shaft journaled in said frame, a spur-wheel and pulley mounted upon one end of said shaft without said frame, and a bevel cog-wheel mounted upon the other end of said main shaft within said frame, of parallel auxiliary shafts mounted in bearings upon said frame above said main shaft, a train of spur-wheels mounted upon said auxiliary shafts meshing together, and one of them meshing into the spur-wheel upon said main shaft, spools mounted upon said auxiliary shafts, upon which wire may be wound, to be conducted through conduits in the inner ends of said auxiliary shafts, another auxiliary shaft journaled in bearings upon said frame, a spur-wheel upon one end of such shaft without said frame and meshing into the spur-wheel on said main shaft, a disk-wheel having an eccentric groove in its face, mounted upon the other end of said shaft within the said frame and connected to a segmental spur-wheel by a connecting-bar, said connecting-bar, said segmental spur-wheel mounted upon a shaft journaled in said frame and connected, as aforesaid, with said disk-wheel, whereby facility is afforded to oscillate said segmental wheel, another segmental wheel attached to an oscillating shaft and meshing into said first-mentioned segmental wheel, said oscillating shaft mounted upon a cross-shaft and carrying upon its upper end a beveled gear-wheel, meshing into the wheel upon the inner end of said main shaft, said bevel-wheel supported by said oscillating shaft and said cross-shaft, said cross-shaft being journaled in the center of said main shaft, and in a short shaft journaled in said frame opposite said main shaft, a bevel-wheel mounted upon one end of said short shaft and meshing into the bevel-wheel upon said oscillating shaft, a spur-wheel mounted upon the other end of said short shaft and meshing into an intermediate spur-wheel mounted upon a shaft secured in said frame, a train of spur-wheels mounted upon parallel shafts meshing together, and one of them meshing into said intermediate wheel, a series of parallel shafts journaled in bearings on said frame and upon which the wheels of said train are mounted, the said parallel shafts having conduits through which the wires from said spools are conducted to twisting-fingers, and a pair of helically-bent twisting-fingers mounted upon the end of each of said shafts and composed of tubes through which said wires pass to afford facility for twisting the same, all substantially as and for the purpose set forth.

2. The combination, in a fence-making machine, with a supporting-frame, a revoluble main shaft journaled in said frame, a spur-wheel mounted upon one end of said shaft without said frame, and a bevel-wheel mounted upon the other end of said main shaft within said frame, of an auxiliary shaft journaled in bearings on said frame, a spur-wheel mounted upon one end of said shaft without said frame and meshing into the spur-wheel upon said main shaft, a disk-wheel having an eccentric groove in its face, mounted upon the other end of said shaft within said frame, a connecting-bar connecting said disk-wheel and a segmental spur-wheel, a shaft journaled in said frame, whereon said segmental wheel is mounted, the construction and arrangement of said disk-wheel, said connecting-bar, and said segmental wheel being such as to afford facility for oscillating said segmental wheel, another segmental spur-wheel mounted upon the lower end of an oscillating shaft and meshing into the first-named segmental wheel, said oscillating shaft carrying said segmental wheel and moving upon a cross-shaft journaled in the center of said main shaft by one end, and by the other end in the center of a short shaft journaled in said frame opposite to and concentric with the said main shaft, so that the periphery of the segmental wheel upon said oscillating shaft and the oscillating motion of said shaft shall be concentric with said main shaft, a bevel-wheel mounted upon the upper end of said oscillating shaft, meshing into the bevel-wheel on the end of said main shaft and actuated thereby, a bevel-wheel mounted upon the end of said short shaft and meshing into the bevel-wheel upon said oscillating shaft, the said three bevel-wheels, said oscillating shaft, said two segmental wheels and the connecting-bar being so arranged and combined that although the main shaft and the bevel-wheel mounted upon it is in continual rotation in one direction, and the bevel-wheel on the oscillating shaft is also in continuous rotation, the rotary motion is only communicated by the bevel-wheel on said oscillating shaft to the bevel-wheel on the short shaft, as said wheel is carried one way by the motion of said oscillating shaft, and when moving the other way this bevel-wheel on the oscillating shaft rolls over the wheel on the short shaft and imparts no motion to it, thus an intermittent motion is produced and the said wheel on the said short shaft, the said short shaft, and all the mechanism propelled by them are periodically still and periodically in motion at regular intervals, substantially as and for the purpose set forth.

3. The combination, in a fence-making machine, with a supporting-frame, a revoluble main shaft journaled in bearings in said frame, a spur-wheel mounted upon said main shaft without said frame, an auxiliary shaft also journaled in bearings in said frame, a spur-wheel mounted upon one end of said auxiliary shaft without said frame and meshing into the spur-wheel upon said main shaft, and a bevel-wheel mounted upon the other end of said auxiliary shaft within said frame, of a cross-shaft journaled in bearings upon said frame at right angles to said auxiliary shaft, a bevel-wheel mounted upon said cross-shaft and meshing into the bevel-wheel upon the end of said auxiliary shaft, two disk-wheels mounted upon said cross-shaft, each having an eccentric groove in its face, an oscillating frame reaching over the upper part of said machine, pivoted by its lower part to the lower part of said supporting-frame, connecting-bars pivotally attached to said oscillating frame, and by means of friction-rollers working in the eccentric grooves of said disk-wheels, connecting them with said oscillating frame, and downwardly-projecting fingers attached to the upper part of said frame, and constructed and arranged to push pickets out of said machine when the same have been properly placed to receive wire to be twisted upon them, substantially as and for the purpose set forth.

4. The combination, in a fence-making machine, with a revoluble main shaft journaled in bearings upon the supporting-frame of said machine, a spur-wheel mounted upon said main shaft, an auxiliary shaft journaled in bearings in said frame, parallel to the said main shaft, a spur-wheel mounted upon one end of said auxiliary shaft without said frame and meshing into the spur-wheel upon said main shaft, and a bevel-wheel mounted upon the other end of said auxiliary shaft within said frame, of a cross-shaft journaled in said frame at right angles to said auxiliary shaft, a bevel-wheel mounted upon said cross-shaft and meshing into the bevel-wheel upon said auxiliary shaft, another bevel-wheel mounted upon the end of said cross-shaft, an inclined shaft also mounted in bearings in said frame, and extending upward diagonally above the upper part of said machine, a bevel-wheel mounted upon the lower end of said inclined shaft and meshing into the bevel-wheel on the end of said cross-shaft, a disk-wheel upon the upper end of said inclined shaft, an eccentric groove in the face of said disk-wheel, a slide moving in a groove in the top of said machine and propelled by a connecting-bar, coupling it to the eccentric of said disk-wheel, so that facility is afforded for pushing pickets into said machine, substantially as hereinbefore specified, a pulley mounted upon the said cross-shaft, another cross-shaft journaled in the frame of said machine parallel to the first-named cross-shaft, a pulley mounted upon said last-named cross-shaft and connected by a belt with the pulley on said first-named cross-shaft, a bevel-wheel mounted on the end of said last-named cross-shaft, an auxiliary shaft journaled in said frame at right angles to the cross-shaft, a bevel-wheel on one end of said auxiliary shaft meshing into the bevel-wheel on the said cross-shaft, a pulley on the other end of said auxiliary shaft, and three other pulleys arranged on proper bearings on the frame of said machine, a belt running over the said pulleys, and so arranged that it will be in proper position to engage and carry a picket into said machine, and springs arranged to press said picket down upon said belt as it passes into said machine, substantially as and for the purpose set forth.

5. In a fence-making machine, the combination, with the revolving main shaft A, journaled in bearings on the frame of said machine, the bevel-wheel V, mounted upon said main shaft, the shaft $C'$, mounted upon said frame, as specified, and connected with said main shaft by means of a gear-wheel on each shaft meshing together, and an eccentric wheel upon said shaft $C'$, of the short shaft $S''$, journaled, as specified, in the main shaft A, and the short shaft $T''$, the oscillating shaft $S'$ mounted upon said shaft $S''$, the bevel-wheel S, mounted upon said oscillating shaft $S'$ and meshing into said wheel V, the bevel-wheel T, mounted upon the said shaft $T''$ and meshing into the wheel S, the segmental wheel $S^\times$, mounted upon the lower end of said oscillating shaft $S'$, the shaft $T^4$, journaled in said frame, as specified, the segmental wheel $T^\times$, mounted thereon, and meshing with the segmental wheel $S^\times$, the bar $K^\times$, connecting said segmental wheel and said eccentric wheel upon said shaft $C'$, the shaft $T''$, journaled in the frame of said machine and having the axis coincident with the said main shaft, and a train of wheels connecting said shaft $T''$ with the twisting-heads of the machine, and all so constructed and arranged that, by means of said mechanism, when the said main shaft is continuously turned in one direction an intermittent rotary motion will be imparted to the said twisting-heads, substantially as and for the purpose set forth.

6. In a fence-making machine, the tubular helically-bent twisting-fingers $i$, mounted upon revoluble shafts journaled in the frame of said machine, and constructed and arranged substantially as and for the purpose set forth.

7. In a fence-making machine, the combination, with the supporting-frame X, the main shaft A, journaled in said frame, the pulley E, the spur-wheel G, and the bevel-wheel V, all mounted on said main shaft A, the shafts B $B'$ $B''$, also journaled in said frame, the wheels H $H'$ $H''$, mounted upon said shafts B $B'$ $B''$, and the spools D, mounted upon the same shafts, of the said shafts, the shaft $C'$, journaled in said frame, the spur-wheel $I'$, mounted upon said shaft $C'$ and meshing into the wheel G, the disk-wheel K, mounted upon the same shaft C', the segmental wheel T×, mounted upon the shaft T⁴, the bar K×, connecting the disk-wheel K and the segmental wheel T×, the shaft T⁴, mounted in bearings in said frame and carrying the segmental wheel T×, the segmental wheel S×, mounted upon the lower end of the oscillating shaft S', mounted on the cross-shaft S'', the cross-shaft S'', journaled in the main shaft A, and the short shaft T'', the bevel-wheel S, mounted upon the oscillating shaft S' and meshing into the wheel V, the bevel-wheel T, mounted on the shaft T'' and meshing into the bevel-wheel S, the shaft T'', journaled in said frame opposite to and concentric with said main shaft A, the spur-wheel T', mounted upon said shaft T'', the wheel U, mounted upon a bearing secured to the frame of said machine and meshing into the wheels U' and T', the spur-wheels U U' U'', meshing together and mounted on short shafts journaled in the frame of said machine, the said shafts, and the twisting-fingers $i$, mounted thereon, all substantially as and for the purpose set forth.

8. In a fence-making machine, the combination, with the frame X thereof, the main shaft A, journaled on said frame, the spur-wheel G, mounted upon said main shaft, the auxiliary shaft C, also journaled in said machine, the spur-wheel I, mounted upon said shaft C and meshing into the wheel G upon said main shaft, and the bevel-wheel L, mounted upon said shaft C, of the shaft M, journaled on said frame X at right angles to said shaft C, the bevel-wheel L', mounted upon said shaft M and meshing into the bevel-wheel L upon said shaft C, the disk-wheels $a$ and $a$, having eccentric grooves in their faces, the oscillating frame $c\ d$, pivoted to said supporting-frame X and reaching over the top of said machine, the downwardly-projecting fingers $e$, fastened to the upper part of said oscillating frame $c\ d$, the bars $b$, connecting the said oscillating frame $c\ d$ with the eccentric grooves of the disk-wheels $a$, the bevel-wheel L'', mounted upon the cross-shaft M, the inclined shaft M', journaled on said supporting-frame, the bevel-wheel L''', mounted upon said shaft M' and meshing into the bevel-wheel L'' upon the shaft M, the disk-wheel O, mounted upon said shaft M', the eccentric groove $h'$ in the face of said wheel O, the pin and friction-roller $h''$, moving in said eccentric grooves, the slide $h$, moving in a groove in the top of said machine, the bar $f$, connecting said slide with said eccentric grooves, the pulley P upon the shaft M, connected to the pulley P' by the belt P×, the shafts N and N, journaled in said supporting-frame, the pulleys P' R R R and R, mounted upon said shafts N and N, the belts R×, connecting the pulleys R, the bevel-wheel O×, mounted upon the shaft N, the shaft Z, journaled in bearings on said frame, the bevel-wheel O', mounted upon said shaft Z and meshing into the bevel-wheel O× on the shaft N, the pulley Z', mounted upon said shaft Z, the pulleys Z'' Z''' Z×, mounted on bearing fastened in said frame, the belt $z$, connecting said pulleys Z' Z'' Z''' Z×, and the springs $z'$, fastened upon the said machine above said wheels Z'' and Z× to afford facility for drawing a picket into said machine, all substantially as and for the purpose set forth.

9. In a fence-making machine, the combination, with the supporting-frame X, the main shaft A, journaled in said frame, the pulley E, the spur-wheel G, and the bevel-wheel V, all mounted on said main shaft A, the shafts B B' B''', also journaled in said frame, the wheels H H' H'', mounted upon said shafts B B' B'', the spools D, upon which wire may be wound, mounted upon the same shafts, the shaft C', journaled in said frame, the spur-wheel I', mounted upon said shaft C' and meshing into the wheel G, the disk-wheel K, mounted upon the shaft C', the segmental wheel T×, mounted upon the shaft T⁴, the bar K×, connecting the disk-wheel K and the segmental wheel T×, the shaft T⁴, mounted in bearings in said frame, the segmental wheel S×, mounted upon the lower end of the oscillating shaft S', the oscillating shaft S', mounted on the cross-shaft S'', the shaft S'', journaled in the main shaft A, and the short shaft T'', the bevel-wheel S, mounted upon the oscillating shaft S' and meshing into the wheel V, the bevel-wheel T, mounted upon the shaft T'' and meshing into the bevel-wheel S, the short shaft T'', journaled in the said frame opposite to and concentric with said main shaft A, the spur-wheel T', mounted upon said shaft T'', the wheel U×, mounted upon a bearing secured to the frame of said machine and meshing into the wheels U' and T', the spur-wheels U U' U'', meshing together and mounted on short shafts journaled in the frame of said machine, the said shafts, and twisting-fingers mounted thereon, of the shaft C, journaled in the frame of said machine, the spur-wheel I, mounted upon said shaft C and meshing into the wheel G upon said main shaft, the bevel-wheel L, mounted upon said shaft C, the shaft M, journaled in said frame X at right angles to said shaft C, the bevel-wheel L', mounted upon said shaft M and meshing into the wheel L upon the shaft C, the disk-wheels $a$ and $a$, having eccentric grooves in their faces, the oscillating frame $c\ d$, pivoted to said supporting-frame X and reaching over the top of said machine, the downwardly-projecting fingers $e$, fastened to the upper part of said oscillating frame, the bars $b$, connecting the eccentric grooves of the said disk-wheels $a$ with said oscillating frame, the bevel-wheel L'', mounted upon the cross-shaft M, the inclined shaft M', journaled on said supporting-frame, the bevel-wheel L''', mounted upon said shaft M' and meshing into the bevel-wheel L'' upon the shaft M, the disk-wheel Q, mounted upon said shaft M', the eccentric groove $h'$ in the face of said wheel Q, the pin and friction-roller $h''$, moving in said eccentric groove, the slide $h$, moving in a groove in the top of said machine, the bar $f$, connecting said slide and said eccentric groove, the pulley P upon the shaft M, connected to the pulley P' by the belt $P^\times$, the shafts N and N, journaled in said supporting-frame, the pulleys P R R R and R, mounted upon said shafts N and N, the belts $R^\times$, connecting the pulleys R, the bevel-wheel $O^\times$, mounted upon the shaft N, the shaft Z, journaled in bearings in said frame, the bevel-wheel O', mounted upon said shaft Z and meshing into the bevel-wheel $O^\times$ on the shaft N, the pulley Z', mounted upon said shaft Z, the pulleys Z'' Z''' $Z^\times$, mounted on bearings fastened on said supporting-frame, the belt $z$, connecting said pulleys Z' Z'' Z''' $Z^\times$, and the springs $z'$, fastened upon said machine above said wheels Z'' $Z^\times$, all in one machine, substantially as and for the purpose set forth.

In witness whereof we hereunto set our hands in presence of two witnesses.

ARTHUR A. PARKER.
JOHN F. LANDERS.

Witnesses:
FREDK. W. RUBIEN,
THOMAS BROWN.